June 25, 1968      O. B. FERGUSON      3,389,880
PARACHUTE SYSTEM FOR MID-AIR LOAD RECOVERY
Filed June 21, 1966      4 Sheets-Sheet 1
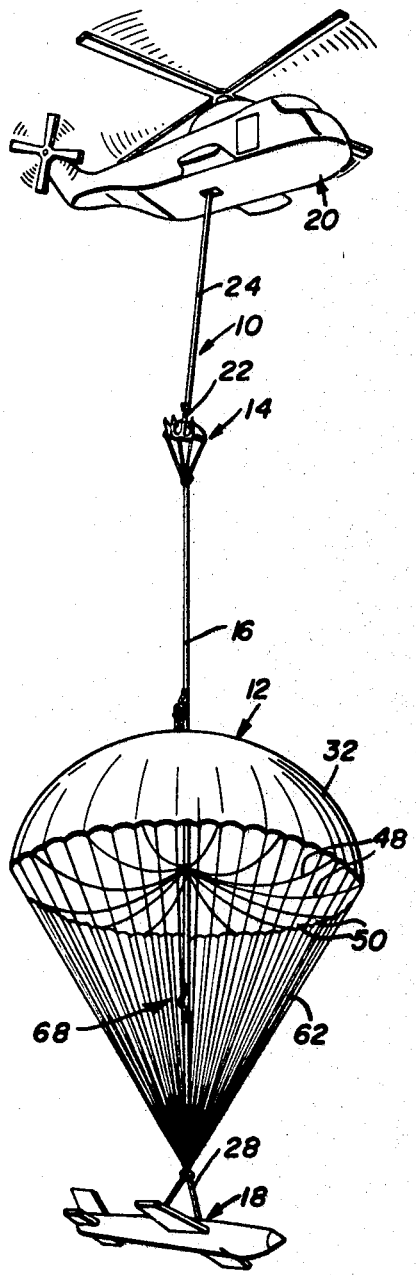
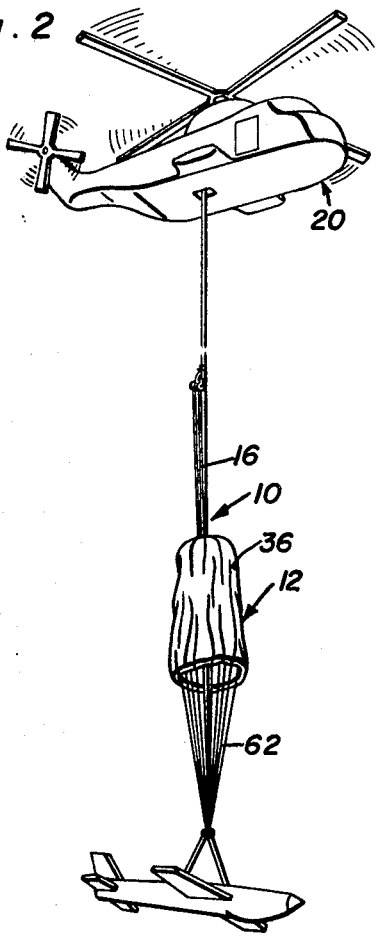
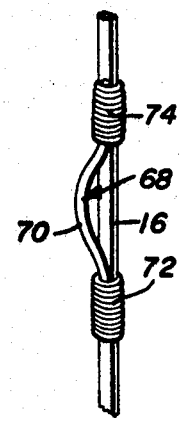
Otis B. Ferguson
INVENTOR.

June 25, 1968   O. B. FERGUSON   3,389,880
PARACHUTE SYSTEM FOR MID-AIR LOAD RECOVERY
Filed June 21, 1966   4 Sheets-Sheet 2
Fig. 3
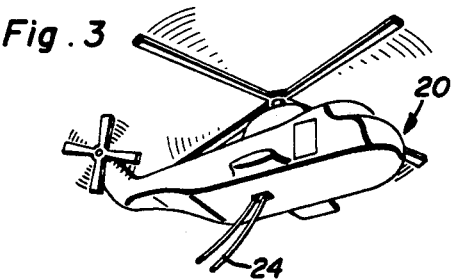
Fig. 7
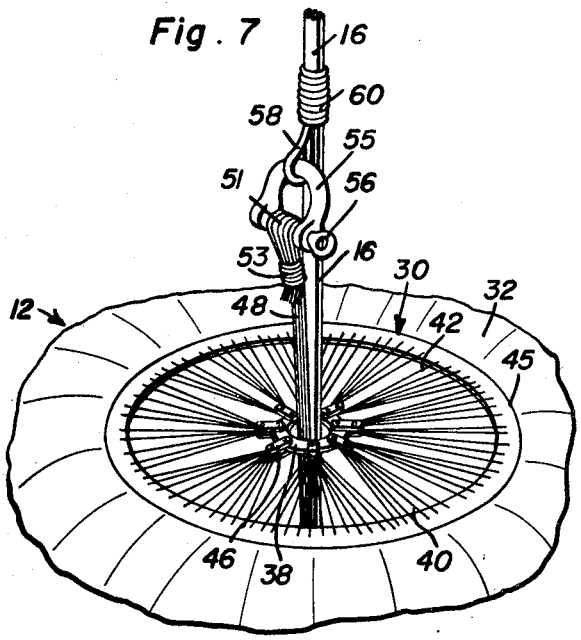
Fig. 8
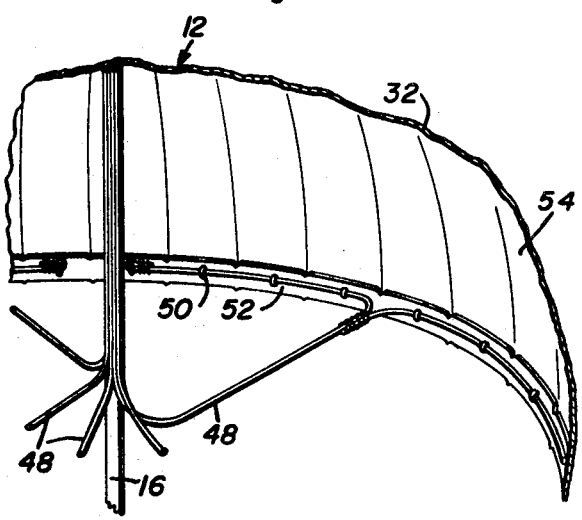
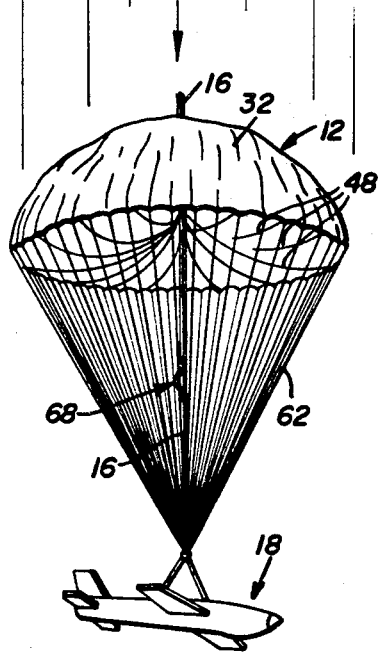
Otis B. Ferguson
INVENTOR.
BY *Clarence A. O'Brien*
and *Harvey B. Jacobson*
Attorneys Otis B. Ferguson
INVENTOR.

June 25, 1968     O. B. FERGUSON     3,389,880

PARACHUTE SYSTEM FOR MID-AIR LOAD RECOVERY

Filed June 21, 1966     4 Sheets-Sheet 4

Otis B. Ferguson
INVENTOR.

BY Clarence A. O'Brien
and Harvey B. Jackson
Attorneys

United States Patent Office
3,389,880
Patented June 25, 1968

3,389,880
PARACHUTE SYSTEM FOR MID-AIR
LOAD RECOVERY
Otis B. Ferguson, Alamogordo, N. Mex., assignor to Recovery Research Systems, Inc., a corporation of New Mexico
Filed June 21, 1966, Ser. No. 559,197
10 Claims. (Cl. 244—137)

ABSTRACT OF THE DISCLOSURE

A parachute re-reefing and dis-reefing apparatus including a main parachute, a drogue parachute located centrally above the main parachute and connected to a common load supported by the shroud lines of the main parachute by means of an elongated load line extending from the drogue chute freely through a vent in the apex of the main parachute to attached engagement with the load. A plurality of reefing lines are secured peripherally about the outer edge of the main parachute canopy and extend radially inward therefrom for engagement with the load line in a manner whereby an upward pull on the load line will produce an inward and upward folding of the peripheral edge of the main parachute so as to effect a predefined collapsing of the main parachute whereby, upon a release of the pull on the load line, the main parachute can reopen.

---

The present invention generally appertains to parachute payload carrying systems, which are adapted to be caught and recovered in mid-air by a recovery craft and, more particularly, relates to a novel parachute system, which is particularly designed and formed for quick and efficient mid-air recovery and for dis-reefing, in the event that the mid-air recovery has to be aborted after engagement has been made by the recovery aircraft, and to novel improvements in means for positioning the payload in delivery relationship with the recovery aircraft so as to be easily carried by the aircraft for delivery to a recovery area.

An important object of the present invention is to provide a re-reef parachute system for mid-air snatching and recovery of the parachute system, with an attached payload, and to form the parachute system in such a manner that it can be more quickly and efficiently raised into a carrying position by the recovery aircraft.

A further important object of the present invention is to provide a more reliable parachute system for mid-air recovery which will re-open and serve to carry the payload safely to the ground in the event a mid-air recovery has to be aborted after engagement of the parachute system has been made by the recovery aircraft.

A further important object of the present invention is to provide a payload carrying parachute system that is designed to be snatched in mid-air by any type of aircraft, including high speed jet aircraft and, in a manner, so that the catch in mid-air produces a minimum impact shock upon the recovery craft and the payload supported by the parachute system.

A still further important object of the present invention is to provide means whereby the load line passes through a reinforced, vented apex on the canopy of a main parachute and has its upper end joined to the drogue parachute, which may be formed in accordance with my prior patent, No. 3,227,403, issued Jan. 4, 1966; the main parachute being provided with a re-reefing system that is engaged with the load line in such a way that, if it is necessary to abort the recovery, the main parachute is able to again dis-reef and lower the payload to the ground in an undamaged and secure manner.

Another important object of the present invention is to provide a re-reef parachute system, wherein the main parachute is formed with reef lines that are attached to the load line in such a way that the reefing lines assist in drawing the shroud lines up toward the recovery aircraft so as to position the payload, in relation to the recovery aircraft, for delivery to a recovery area.

Another important object of the present invention is to provide a re-reef parachute system, which is extremely reliable, compact and efficient and which, at the same time, can be inexpensively manufactured.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a diagrammatic perspective view illustrating the parachute system of the present invention in association with a payload and a recovery aircraft;

FIGURE 2 is a diagrammatic perspective view illustrating the arrangement and relationship of the parachute system to the recovery aircraft and payload, after successful engagement has been made by the recovery aircraft with the parachute system and the main parachute begins to reef;

FIGURE 3 is a diagrammatic perspective view illustrating the relationship of the main parachute of the parachute system with the payload and the recovery aircraft, in the event recovery has to be aborted, and showing the main parachute starting to dis-reef;

FIGURE 6 is a detailed perspective view of a load line loop to which the reefing lines of the main parachute are attached, when the payload is in the position, shown in FIGURE 5, for delivery to the recovery area;

FIGURE 7 is a fragmentary perspective view, showing the construction of the vented apex on the canopy of the main parachute and showing the manner of attachment of the reefing lines of the main parachute to the load line;

FIGURE 8 is a fragmentary perspective view, showing the manner of installing the reefing lines of the main parachute to the skirt band of the canopy thereof;

Figure 9:
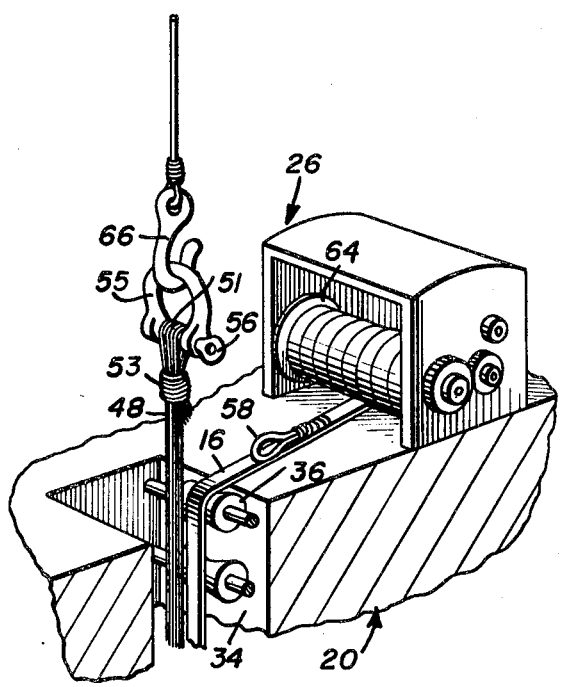
Figure 10:
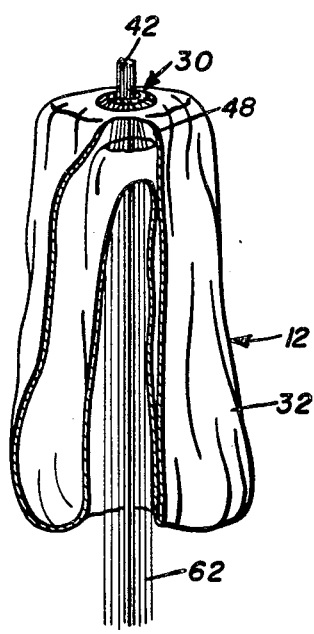
Figure 5:
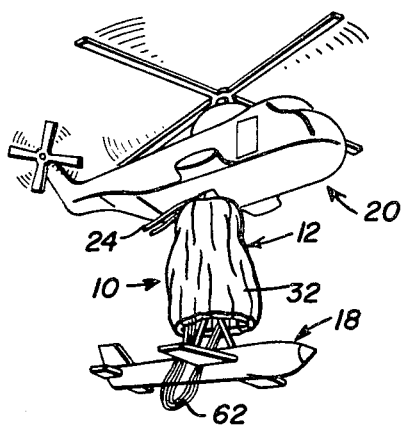
FIGURE 5 is a diagrammatic perspective view, showing the payload in position on the recovery aircraft for delivery to a recovery area.
Figure 12:
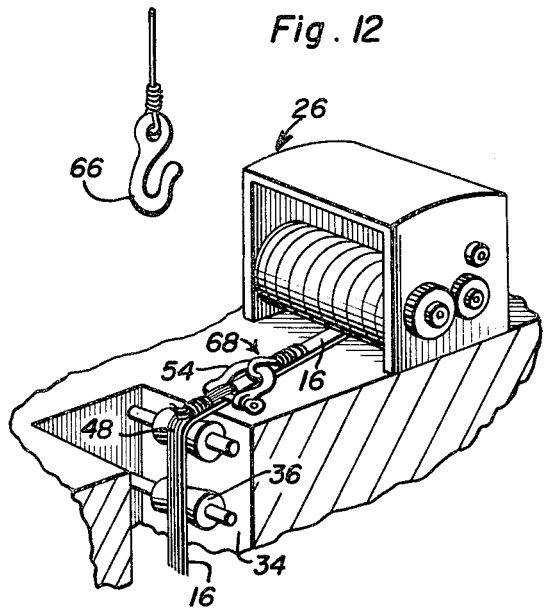
Figure 11:
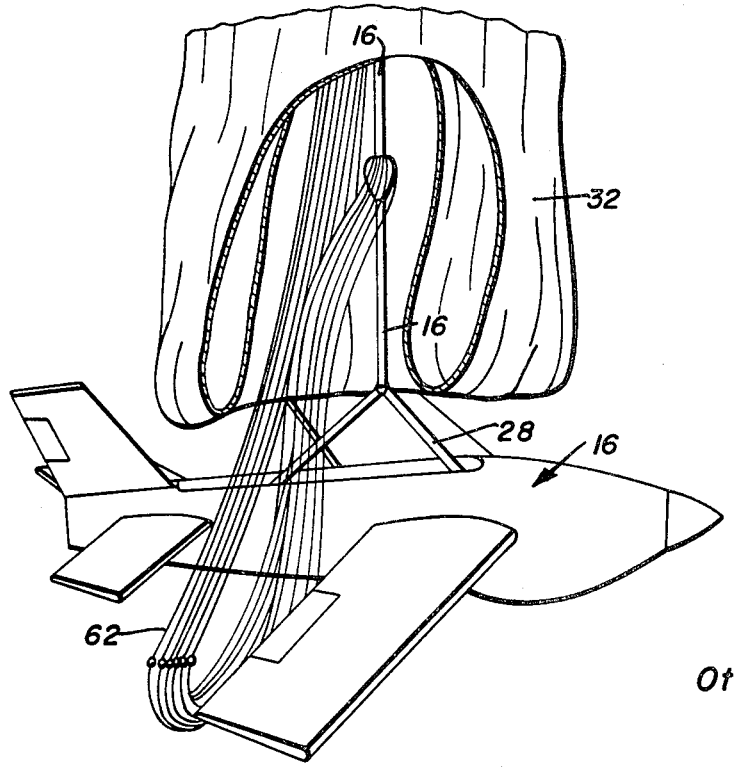

FIGURE 9 is a fragmentary perspective view, showing a winch means on the recovery aircraft for winding up the load line and drawing the main parachute and payload to a position, in relation to the aircraft, for delivery to the recovery area and showing a retainer hook means for the temporary anchoring of the reefing lines of the main parachute, during the drawing up of the main parachute and payload toward the underside of the recovery aircraft;

FIGURE 10 shows the main parachute in a completely re-reefed arrangement so as to allow the payload to be brought up close to the bottom of the recovery aircraft for towing without excess material endangering the recovery aircraft;

FIGURE 11 is a perspective view, on an enlarged scale, showing the payload in position for delivery to the recovery area, as shown more schematically in FIGURE 5, and, FIGURE 12 is a fragmentary, detailed perspective view showing the means for attaching the reefing lines of the main parachute to the load line, when the main parachute is completely re-reefed and in adjacency, with the payload, to the underside of the aircraft for delivery of the payload by the aircraft to a recovery area.

Referring now more particularly to the accompanying drawings and, initially and generally to FIGURES 1 through 5, for a general understanding of the re-reef parachute system of the present invention and the general construction and arrangement thereof for carrying a payload, the parachute system 10 principally includes a main parachute 12, a drogue parachute 14, which may be formed in accordance with my prior patent, No. 3,227,403, and a load or drogue line 16, which is attached at its lower end to any type of payload 18 and at its upper end to the drogue parachute. The load line passes through the vented apex of the main parachute 12 and supports the payload 18.

In actual practice, the payload 18 and parachute system 10 are dropped from a carrier, which may be any type of high altitude airplane or other space vehicle, and the drogue parachute 14 opens initially, with the main parachute 12 then opening and the parachutes being in the open, inflated positions, as shown in FIGURE 1. The parachute system is then ready for catching by a recovery aircraft 20. The recovery aircraft 20 has a grapple hook 22 depending therefrom and carried by a hauling line 24, which is attached to a suitable winch means 26 mounted in the recovery craft 20.

When the grapple hook 22 captively engages the drogue parachute 14, the winch or haul line 24 is then attached to the load line 16 and the winch is rendered operative to haul up the main parachute 12 and the payload 18, as shown in FIGURE 2.

In the event that the mid-air recovery has to be aborted after engagement has been made by the recovery aircraft, as shown in FIGURES 1 and 2, the winch or towline 24 can be cut and the main parachute 12 will dis-reef, as shown in FIGURE 3, and descend safely to the ground, so that the payload 18 will be safely floated down to the ground by the main parachute, without damaging or injuring the payload, which may be of a very destructible nature, for example, a scientific apparatus or instrument.

Figure 4:
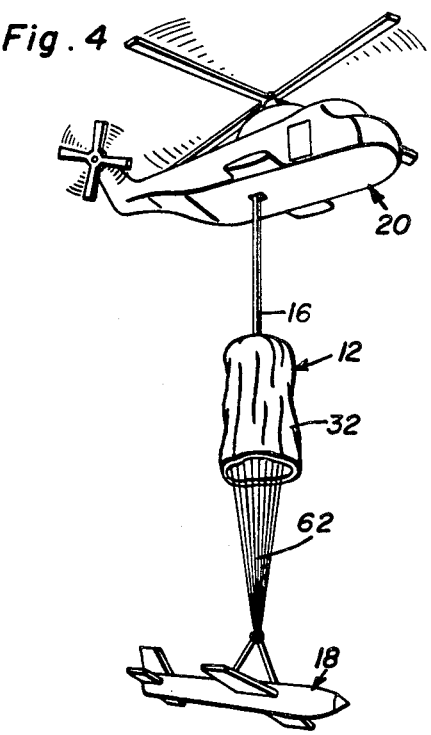
FIGURE 4 is a diagrammatic perspective view showing the main parachute and payload in relationship to the recovery arcraft at a point just prior to the final attachment of the payload to the recovery aircraft for delivery thereby to a recovery area.

If the recovery is not aborted, the payload 18 is drawn toward the bottom of the recovery aircraft 20, as shown in FIGURE 4, until the payload is in its captive position, as shown in FIGURE 5, for delivery by the aircraft to a recovery area.

Referring more specifically to the drawings, the load or drogue line 16 is attached to the payload 18 by an anchoring and load equalizing lower end portion 28. The load line 16 passes through the vented apex 30, as shown in FIGURE 7 and will be more particularly described, of the canopy 32 of the main parachute 12 and is attached to the drogue parachute 14.

The recovery aircraft 20 is provided with a suitable winch means 26, as shown in FIGURE 9, which carries a tow or hauling line 24 that has the grapple hook 22 on its lower end, the grapple hook 22 being adapted to engage and capture the drogue parachute in the mid-air recovery of the parachute system, as shown in FIGURE 1.

The underside of the fuselage of the recovery aircraft is formed with a vertical opening 34, through which the towline 24 extends and into which the load line 16 and the reefing lines of the main parachute, as will be explained, are drawn by the winch means 26. Suitable pulleys or rollers 36 may be provided in the opening 34 and over which the towline and load line 16 can pass, so as to prevent any friction between the walls of the opening 34 and the associated tow and load lines 24 and 16.

As shown in detail in FIGURE 7, the vented box assembly 30 on the canopy 32 of the main parachute 12 comprises an annular ring 38 which is disposed concentrically within the apex opening 40 and which is securely supported in such position by anchoring lines 42 that radially extend from the reinforced annular edge 45 of the opening 40 and are attached to the ring 38 by radially extending and cooperating pairs of clamping plates 46.

The annular ring 38 provides a friction free, accurate guide means through which the load line 16 passes and through which the reefing lines 48 are adapted to pass, as the main parachute 12 is reefed.

As shown in detail in FIGURE 8, a plurality of reefing lines 48 are provided. Each reefing line is attached to reefing rings 50 which are formed on the inside of the reinforced hem or lower edge 52 of the skirt portion 54 of the canopy 32 of the main parachute 12. The reefing lines are individually attached by the reefing rings 50 to adjoining segmental portions of the lower edge or hem portion 52 of the skirt 54 so that the entire inner surface of the lower edge of the skirt portion is formed with the reefing rings 50 and a certain number of the rings are used for attaching an individual reefing line 48 to a segmental portion of the skirt portion 54 of the canopy 32 of the main parachute. The reefing lines are collected together, with the reefing lines radiating inwardly into a common grouping, as shown in FIGURES 3 and 8, when the main parachute is opened.

The combined reefing lines 48 are adapted to pass through the annular ring 38, as shown in FIGURE 7, after the parachute system starts to re-reef, when engagement has been made by the towline 24 with the drogue parachute 14 through the medium of the grapple hook 22 or other engaging and captivating member.

The reefing lines are collected together and folded back upon themselves at their free or unattached ends to form a common looped end 51 which is secured by a wrapping or binding 53. The common looped end 51 of the reefing lines is attached to a clevis 55 by means of a transverse pin 56 which passes transversely through the outer ends of the legs of the clevis and through the loop 51, as shown in FIGURE 7. The reefing lines are, at all times, during re-reefing of the main parachute attached to the load line 16 by means of the clevis 55, which is attached to an upper loop or hook 58 attached by suitable wrapping 60 to the load line 16, as shown in FIGURE 7.

In this respect, it is to be noted that the load line passes through the reinforced, vented apex structure 30 of the canopy of the main parachute directly from the payload 18 to the drogue parachute 14 and the shroud lines 62 of the main parachute are not in any structural way involved with the supporting of the payload during re-reefing of the main parachute.

The reefing lines, through the clevis 55 and loop or hook 58, are attached to the load line 16. After the successful engagement of the parachute system by the towline 24 of the recovery aircraft 20, as shown in FIGURE 1, the winch means is rendered operative and the main parachute collapses, as shown in FIGURE 2, and starts to re-reef, as shown in FIGURES 4 and 10.

The payload 18 is drawn toward the bottom of the recovery aircraft by the winch means 26 and the load line 16 is coiled around the drum 64 of the winch means, with the reefing lines 48 carried by the load line into the interior of the recovery aircraft through the opening 34. When the reefing line attaching loop 58 on the load line 16 is disposed within the interior of the aircraft, as shown in FIGURE 9, the clevis 55 on the free ends of the reefing lines 48 of the main parachute is removed from the loop 58 and is placed on a retainer hook 66, which is suitably suspended inside the recovery aircraft, as shown in FIGURE 9.

The load line 16 is then continued to be winched into the aircraft by means of the winch means 26 until a second load line loop 68 is disposed within the interior of the aircraft, as shown in FIGURE 12. The second load line loop 68 comprises a member 70 having its opposing ends secured by wrappings 72 and 74 to the load line so that the member 70 is bowed outwardly from the plane of the load line and creates the loop. The clevis 55 is attached to the loop 68, as shown in FIGURE 12, and the payload 18 is then in a position, as shown in FIGURE 5 and in greater detail in FIGURE 11, for delivery by the recovery aircraft 20 to a suitable recovery area.

In the event that the mid-air recovery has to be aborted after engagement has been made by the recovery aircraft, as shown in FIGURES 1 and 2, then it is only necessary to sever the towline 24, as shown in FIGURE 3. In the event that recovery is aborted, for some reason, the severing of the aircraft tow or haul line 24 frees the main parachute 12 and the main parachute begins to dis-reef, as shown in FIGURE 3, from its collapsed or reefed position of FIGURE 2. The main parachute is capable of completely dis-reefing and descending to the surface, as shown in FIGURE 3, with payload 18 securely suspended from the parachute 12, through being attached to the shroud lines 62. In this respect, the reefing lines 48, in their collective or bundled association have the clevis 55 on their collective outer ends and the clevis is attached to the loop or hook 58, which is secured to the load line 16, just above the vented apex on the canopy 32 of the main parachute 12.

Accordingly, it can be appreciated that the parachute system can be deployed in a reefed condition for high speed shock load deployment, thereby replacing conventional reefing generally used for this purpose. The re-reef parachute system, after deployment and dis-reefing, is easily and shockproofly engaged by the recovery aircraft 20 and the re-reef parachute system can be completely and quickly re-reefed, so as to permit the payload to be drawn up close to the bottom of the recovery aircraft 20 for towing without excess material endangering the operation of the recovery aircraft.

If, as aforestated, after a successful engagement of the parachute system has been made by the recovery aircraft, it is necessary to abort the recovery, the re-reef parachute system 10 will function so that the parachute system will again dis-reef and lower the payload carefully and easily to the ground in an undamaged condition.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A re-reef parachute system for carrying a suspended payload and adapted to be caught in mid-air by a recovery aircraft comprising a main parachute, a drogue parachute for flying above the main parachute and adapted to be caught by a towline suspended from the recovery aircraft, a load line connected between the drogue parachute and the payload, said main parachute including a canopy having a vented apex through which the load line passes, reefing lines carried by the main parachute and means attaching the reefing lines to the load line whereby after the drogue parachute has been captured by the towline the main parachute is reefed and if the mid-air recovery is aborted by severing the towline, the main parachute can completely dis-reef and lower the payload to the ground in a manner so that the payload will not be damaged in coming into contact with the ground, said canopy having an outer edge portion and means attaching the reefing lines to the inside of said canopy adjacent said edge portion with the reefing lines passing commonly through the vented apex and commonly secured by said first mentioned attaching means to the load line above the canopy.

2. A re-reef parachute system for carrying a suspended payload and adapted to be caught in mid-air by a recovery aircraft comprising a main parachute, a drogue parachute for flying above the main parachute and adapted to be caught by a towline suspended from the recovery aircraft, a load line connected between the drogue parachute and the payload, said main parachute including a canopy having a vented apex through which the load line passes, reefing lines carried by the main parachute and means attaching the reefing lines to the load line whereby after the drogue parachute has been captured by the towline the main parachute is reefed and if the mid-air recovery is aborted by severing the towline, the main parachute can completely dis-reef and lower the payload to the ground in a manner so that the payload will not be damaged in coming into contact with the ground, said vented apex of the canopy including the provision of a circular opening in the apex of the canopy, an annular ring concentrically disposed within the center of the opening and anchor lines radially connected between the bounding edge of the circular opening and the annular ring with the load line and reefing lines passing through said ring.

3. A parachute recovery apparatus for mid-air recovery of a suspended load by a recovery aircraft, said apparatus comprising a main parachute including a canopy having a vented apex and shroud lines for suspending a load therebeneath, a drogue parachute for flying above the main parachute, said drogue parachute being adapted to be caught by a recovery aircraft, a load line connected to the drogue parachute and extending therefrom freely through the vented apex of the main parachute for engagement with a common load with the main parachute shroud lines, a plurality of reefing lines engaged with the main parachute canopy at peripherally spaced points about the outer edge portion thereof, said reefing lines extending radially inward toward said load line and upwardly through the vented apex, and means fixing the inner ends of said reefing lines to said load line above the canopy whereby a relative upward movement of the load line, upon a catching of the drogue parachute, will, through the reefing lines, produce a relative inward and upward folding of the periphery of the main parachute and a collapsing thereof about the load line.

4. A parachute re-reefing and dis-reefing apparatus for mid-air recovery operations relative to a parachute suspended load, said apparatus comprising a main parachute including a canopy having a vented apex and shroud lines for suspending a load therebeneath, a drogue parachute for flying above the main parachute, said drogue chute being adapted to be caught by a recovery aircraft, a load line connected to the drogue parachute and extending therefrom freely through the vented apex of the main parachute for engagement with a common load with the main parachute shroud lines, means engaged between the parachute canopy toward the outer periphery thereof and said load line, said means being freely movable through said vented apex for effecting a relative upward and inward folding of the outer periphery of the main parachute in response to a relative upward movement of the load line upon a catching of the drogue parachute thereby effecting a collapsing of the main parachute about the load line, said main parachute shroud lines being engaged about the outer periphery of said main parachute and, upon a releasing of the load line, effecting, through the shroud line supported load, a downward unfolding of the periphery of the main parachute.

5. An aerial recovery method comprising the steps of deploying a parachute-supported load for airborne gravitational descent with a load line attached to and extending vertically from the load through the parachute, engaging the load line at an upper portion by a towline secured on a recovery aircraft, transferring the weight of the load from the parachute to the aircraft through the load line, towing the load and canopy in a depending manner from the aircraft after engagement, drawing the load line into the aircraft and the supported load toward the aircraft, and folding the peripheral edge portion of the parachute, and the shroud lines secured thereto, inwardly and upwardly about the load line as the load line is drawn toward the aircraft, and reopening the main parachute by release of the load line from the recovery aircraft thereby resuming the lowering of the load by the parachute.

6. In a method of mid-air payload recovery wherein a parachute system including a payload, a drogue parachute, a load line connected at one end to the drogue parachute, and a main parachute inclusive of a canopy disposed between the payload and the other end of the load line are released for airborne gravitational descent under support of the main parachute, the steps of engaging the drogue parachute and associated load line with a towline secured on a recovery aircraft, transferring the weight of the payload from the main parachute to the recovery aircraft, contracting the canopy of the main parachute by drawing the outer edge portions of the canopy inwardly of the main parachute through upwardly directed forces applied to the load line from the recovery aircraft, towing the load and contracted canopy in a depending manner from the aircraft, and reopening the main parachute upon terminating towing by separating the load line from the towline and releasing said outer edge portion of the canopy thereby permitting resumption of the lowering of the payload by the main parachute.

7. In a method of mid-air payload recovery wherein a parachuate system including a payload, a drogue parachute, a load line connected at one end to the drogue parachute, and a main parachute disposed between the payload and the other end of the load line are released for airborne gravitational descent under support of the main parachute, the steps of engaging the drogue parachute and associated load line with a towline secured on a recovery aircraft, transferring the weight of the payload from the main parachute to the recovery aircraft, contracting the canopy of the main parachute by pulling the lower end portions of the canopy upwardly toward its apex by forces applied to the load line from the recovery aircraft to thereby facilitate transport of the engaged system by the aircraft, towing the load and contracted canopy in a depending manner from the aircraft, and reopening the main parachute upon terminating towing by separating the load line from the towline thereby permitting resumption of the lowering of the payload by the main parachute.

8. A parachute comprising a canopy, suspension lines connected at one end to a lower portion of the canopy and adapted for connection to a payload at the other end for support of the payload by the canopy and suspension lines during gravitational descent, and control line means for the canopy and suspension lines inclusive of a first portion centrally of the canopy and suspension lines arranged for connection between a towline above the canopy while airborne and a payload and a second portion joined at spaced peripheral portions of the suspension lines and canopy, said control line means transferring the weight from the canopy and contracting the canopy to an open payload supporting position while from above the canopy, said control line means releasing the suspension lines and canopy upon the termination of said forces applied from above so as to return the canopy to an open payload supporting position while airborne.

9. A parachute comprising a canopy having a vented apex, suspension lines connected at one end to an outer portion of the canopy and adapted for connection to a payload at the other end for support of the payload by the canopy and suspension lines during gravitational descent, and control line means carried by the canopy and suspension lines inclusive of a load support portion arranged for connection between a towline above the canopy and a payload and a reefing portion joined at spaced peripheral portions of the canopy and suspension lines, said control line means directly connecting a towing vehicle to the load to transfer the weight of the load from the canopy and reefing the canopy to contract the canopy when forces are applied to the control line means from above the canopy, said control means releasing the canopy and suspension lines upon termination of said forces applied from above so as to return the canopy to an open payload supporting position while airborne.

10. A re-reef parachute system for carrying a suspended payload and adapted to be caught in mid-air by a recovery aircraft comprising a main parachute having suspension lines for airborne carriage of a payload, a drogue parachute for flying above the main parachute and adapted to be caught by a towline suspended from the recovery aircraft, control line means carried by the main parachute inclusive of a first portion connected between the load and the drogue parachute and a second portion joined at spaced peripheral portions of the main parachute whereby after the drogue parachute has been captured by the towline the weight of the load is transferred from the main parachute to the recovery aircraft and the main parachute is reefed by forces applied from above to the control line means and if the mid-air recovery is aborted by severing the towline, the main parachute can completely dis-reef and lower the payload to the ground.

References Cited
UNITED STATES PATENTS

| | | | |
|---|---|---|---|
| 2,721,716 | 10/1955 | Beadle | 244—142 |
| 2,980,371 | 4/1961 | Finney | 244—152 |
| 3,137,465 | 6/1964 | Mulcahy | 244—142 |

FERGUS S. MIDDLETON, *Primary Examiner.*

ALFRED E. CORRIGAN, *Examiner.*

T. W. BUCKMAN, *Assistant Examiner.*

UNITED STATES PATENT OFFICE
CERTIFICATE OF CORRECTION

Patent No. 3,389,880                                    June 25, 1968

Otis B. Ferguson

It is certified that error appears in the above identified patent and that said Letters Patent are hereby corrected as shown below:

In the heading to the printed specification, lines 4 and 5, "Recovery Research Systems, Inc." should read -- Recovery Systems Research, Inc. --.

Signed and sealed this 30th day of December 1969.

(SEAL)
Attest:

Edward M. Fletcher, Jr.                          WILLIAM E. SCHUYLER, JR.
Attesting Officer                                       Commissioner of Patents